United States Patent
Cahill, III

(10) Patent No.: US 7,277,133 B2
(45) Date of Patent: *Oct. 2, 2007

(54) ADJUSTING PIXEL CLOCK

(75) Inventor: Benjamin M. Cahill, III, Ringoes, NJ (US)

(73) Assignee: Intel Corporation, Santa Clara, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 11/174,929

(22) Filed: Jul. 5, 2005

(65) Prior Publication Data

US 2005/0264695 A1   Dec. 1, 2005

Related U.S. Application Data

(63) Continuation of application No. 09/881,304, filed on Jun. 13, 2001, now Pat. No. 6,943,844.

(51) Int. Cl.
  *H04N 5/04* (2006.01)
(52) U.S. Cl. ............... 348/537; 348/536; 348/505; 348/511; 348/533; 345/213
(58) Field of Classification Search ........... 348/537, 348/539, 553, 513, 536, 510, 505, 511, 425.4, 348/607, 497, 563, 569, 564, 565, 567, 194, 348/516, 544; 375/355, 354, 371; 345/213, 345/698, 531, 204
See application file for complete search history.

(56) References Cited

U.S. PATENT DOCUMENTS

| 4,595,953 | A | * | 6/1986 | Willis | 348/516 |
|---|---|---|---|---|---|
| 4,623,925 | A | * | 11/1986 | Tults | 348/537 |
| 4,791,488 | A | * | 12/1988 | Fukazawa et al. | 348/537 |
| 4,835,611 | A | * | 5/1989 | Nishitani | 348/571 |
| 4,847,678 | A | * | 7/1989 | McCauley | 348/537 |
| 5,359,366 | A | * | 10/1994 | Ubukata et al. | 348/536 |
| 5,371,513 | A | * | 12/1994 | Drako et al. | 345/620 |
| 5,446,496 | A | * | 8/1995 | Foster et al. | 348/441 |
| 5,451,981 | A | * | 9/1995 | Drako et al. | 345/620 |
| 5,600,379 | A | * | 2/1997 | Wagner | 348/497 |
| 5,668,594 | A | * | 9/1997 | Cahill, III | 348/194 |
| 5,719,511 | A | * | 2/1998 | Le Cornec et al. | 327/146 |
| 5,731,843 | A | * | 3/1998 | Cappels, Sr. | 348/537 |
| 5,764,240 | A | * | 6/1998 | Herz | 345/546 |
| 5,805,233 | A | * | 9/1998 | West | 348/537 |
| 6,177,959 | B1 | * | 1/2001 | Bril | 348/521 |
| 6,288,699 | B1 | * | 9/2001 | Kubota et al. | 345/99 |
| 6,304,296 | B1 | * | 10/2001 | Yoneno | 348/537 |

(Continued)

FOREIGN PATENT DOCUMENTS

EP    180450 A2 *  5/1986

(Continued)

*Primary Examiner*—David Ometz
*Assistant Examiner*—Jean W. Désir
(74) *Attorney, Agent, or Firm*—Trop, Pruner & Hu, P.C.

(57) ABSTRACT

A pixel clock frequency is adjusted in response to periodically monitoring the relative positions between a video signal to be displayed and a video signal captured. Image shear of the display signal may be avoided quickly. Adjustments are made to the color burst signal where dramatic changes in the pixel clock frequency result.

28 Claims, 13 Drawing Sheets

U.S. PATENT DOCUMENTS

| | | | |
|---|---|---|---|
| 6,304,297 B1 * | 10/2001 | Swan | 348/556 |
| 6,441,658 B1 * | 8/2002 | Taraci et al. | 327/147 |
| 6,522,365 B1 * | 2/2003 | Levantovsky et al. | 348/537 |
| 6,532,042 B1 * | 3/2003 | Kim | 348/537 |
| 6,573,946 B1 * | 6/2003 | Gryskiewicz | 348/600 |
| 6,636,269 B1 * | 10/2003 | Baldwin | 348/500 |
| 6,744,472 B1 * | 6/2004 | MacInnis et al. | 348/441 |
| 6,943,844 B2 * | 9/2005 | Cahill, III | 348/537 |
| 7,119,815 B1 * | 10/2006 | Cahill, III | 345/629 |

FOREIGN PATENT DOCUMENTS

| | | |
|---|---|---|
| JP | 5-83686 | 4/1993 |

* cited by examiner

MAINTAINING SHEAR-FREE DISPLAY

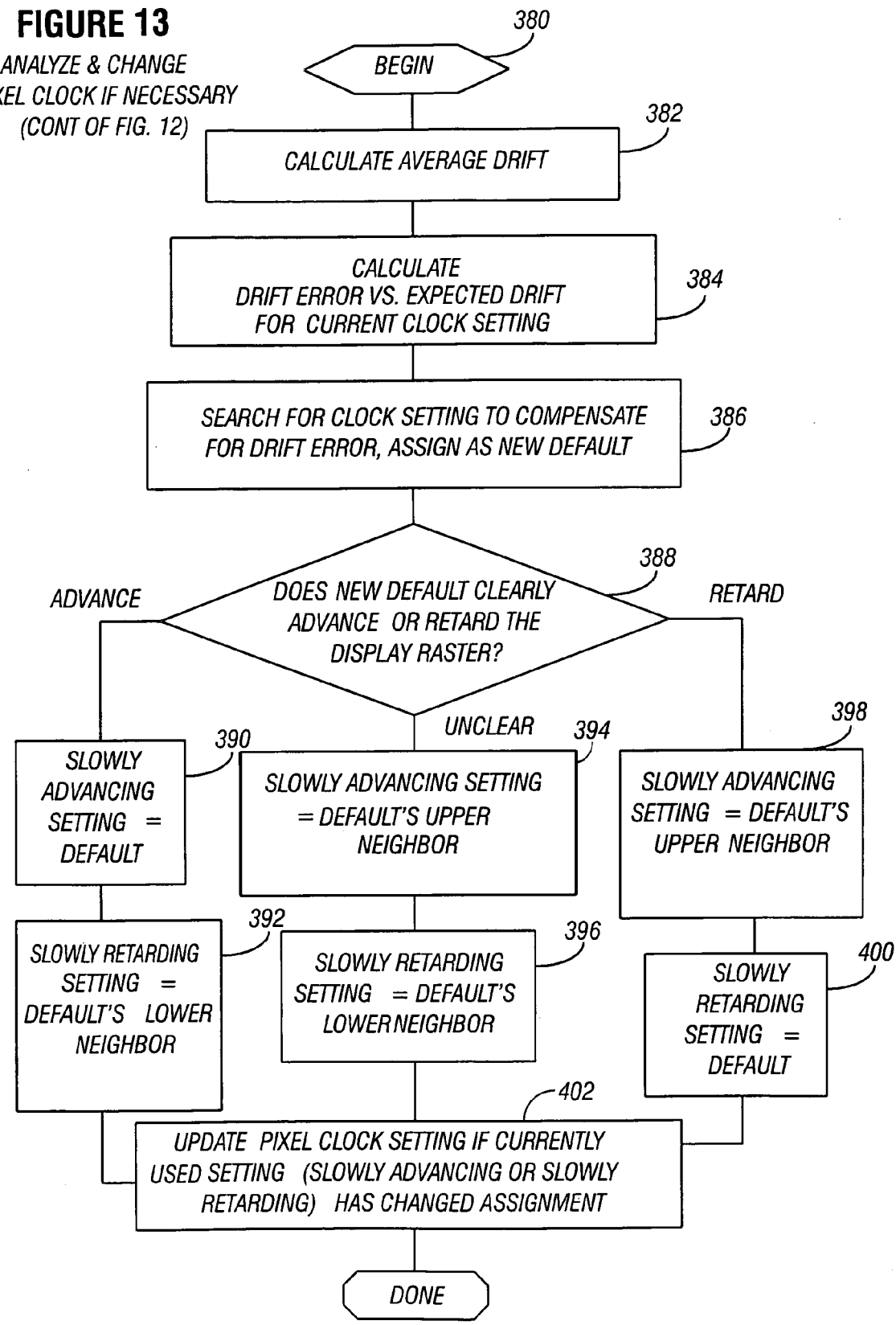

ADJUSTING PIXEL CLOCK

This is a continuation of prior application Ser. No. 09/881,304, filed Jun. 13, 2001 now U.S. Pat. No. 6,943,844.

BACKGROUND

This invention relates to video signals and, more particularly, to effective synchronization of video signals.

An image viewed on a television monitor may be transmitted there from a number of sources. Both live broadcasts and taped programming are examples of video signals that may be sent to the television monitor. These video signals are often combined with personal computer (PC) graphics signals. PC graphics, typically created on a processor-based system, may be combined with the television signal prior to viewing on a television display.

A set-top box is a processor-based system that employs a television monitor instead of a computer monitor for viewing video signals, PC graphics signals, or a combination of the two. The set-top box may execute application software, such as electronic mail programs and web browsers, connect to a data network such as the Internet, and receive and display television program signals.

Set-top boxes may combine a broadcast video signal with a graphics signal. The set-top box receives the video signal from an external source, such as via a coaxial cable, and mixes the signal with the PC graphics signal, typically generated from within the set-top box.

Because some processing of the incoming video signal is generally performed in the set-top box, a frame buffer may provide temporary storage of the video signal. Processing operations may include scaling, mixing, color conversion, and filtering, to name a few. These operations are typically performed by a video decoder and/or graphics controller inside the set-top box.

In addition to active video, the incoming video signal includes other information with which the set top box properly decodes the intended image. A horizontal synchronization, or hsync, signal, for example, precedes each scan line of active video. A vertical synchronization, or vsync, signal precedes each field of active video. A color burst signal supplies a reference by which the set top box decodes the color information within the active video portion of the video signal.

Typically, only the active video portion of the video signal is stored in the set-top box frame buffer. To generate the set-top box's output display signal, the horizontal sync, vertical sync, and color burst are regenerated within the set-top box, coupled with the processed active video and PC graphics, and sent to the television monitor. The television monitor thus may display the image as an adaptation of the signal originally received into the set-top box.

The display signal's horizontal sync, vertical sync, and color burst signals are generated using a pixel clock. The pixel clock is typically a high-frequency square wave generated by a phase-locked loop (PLL). The PLL, in turn, may use a crystal oscillator as a frequency reference.

Crystal oscillators are fairly accurate. Nevertheless, crystal oscillators are manufactured with certain tolerances, or inaccuracies, which may affect their performance. The inaccuracies may be particularly evident when subjected to changes in temperature. The inaccuracies reflect through the pixel clock PLL, and, consequently, may affect the timing of other signals recreated during video processing.

The tolerance of a device is usually related to its cost. Thus, a lower-cost oscillator may have a wider tolerance range than a higher-cost oscillator. Set-top boxes tend to be lower-cost processor-based systems, relative to desktop and laptop computers, for example. Thus, a set-top box may employ a crystal oscillator with a relatively wide tolerance.

The set-top box's output display color burst is typically generated by a second PLL referenced to the pixel clock PLL. If the color burst frequency is not as expected by the television monitor, the television display may distort the color or may stop displaying color at all, reverting to black and white images, which may also be distorted.

Where the set-top box's output display raster is referenced to the local crystal oscillator, it will drift relative to the incoming video signal's raster, which is generated from a remote frequency reference. As the output raster changes timing/phase relationships with the incoming video, the displayed image of the incoming active video may exhibit certain anomalies. When scaling incoming video, shearing may occur, in which the top portion of the displayed video is from a different incoming field than is the bottom portion. When not scaling, occasional shearing, dropping, or duplication of fields of the incoming video image may occur within the display raster.

Double buffering techniques, in which two or more frames of incoming video are stored in the frame buffer, can overcome the shearing problem, but still result in periodic field duplication or dropping, and take twice as much frame buffer memory as storing a single frame. In addition, this technique delays the video image longer than does single buffering, and can introduce synchronization anomalies with the audio content of the television program, as perceived by the person observing the program.

Hard sync-lock techniques, in which the display raster locks directly onto the capture raster's sync signals, can also overcome the shearing problem if the polarity of the display field is opposite to the polarity of the capture field. However, this results in disturbance of the PC graphics display when the incoming video source changes, for example when changing TV channels. In addition, this technique is not available in many PC graphics hardware chips.

Thus, there is a continuing need to adjust the pixel clock phase-locked loop and the color burst signal to avert display anomalies.

BRIEF DESCRIPTION OF THE DRAWINGS

FIG. 13 is a flow diagram for adjusting the pixel clock in order to maintain the color burst frequency, according to one embodiment of the invention;

DETAILED DESCRIPTION

In accordance with the embodiments described herein, a pixel clock generator and color burst generator are adjusted such that a display signal may properly be viewed on a television monitor. The adjustments synchronize a display raster with a capture raster to eliminate image shear without excessive use of frame buffer memory, and assure that a television monitor receives a valid color burst signal. The adjustments are performed gracefully to avoid jitter of displayed images.

Figure 1:
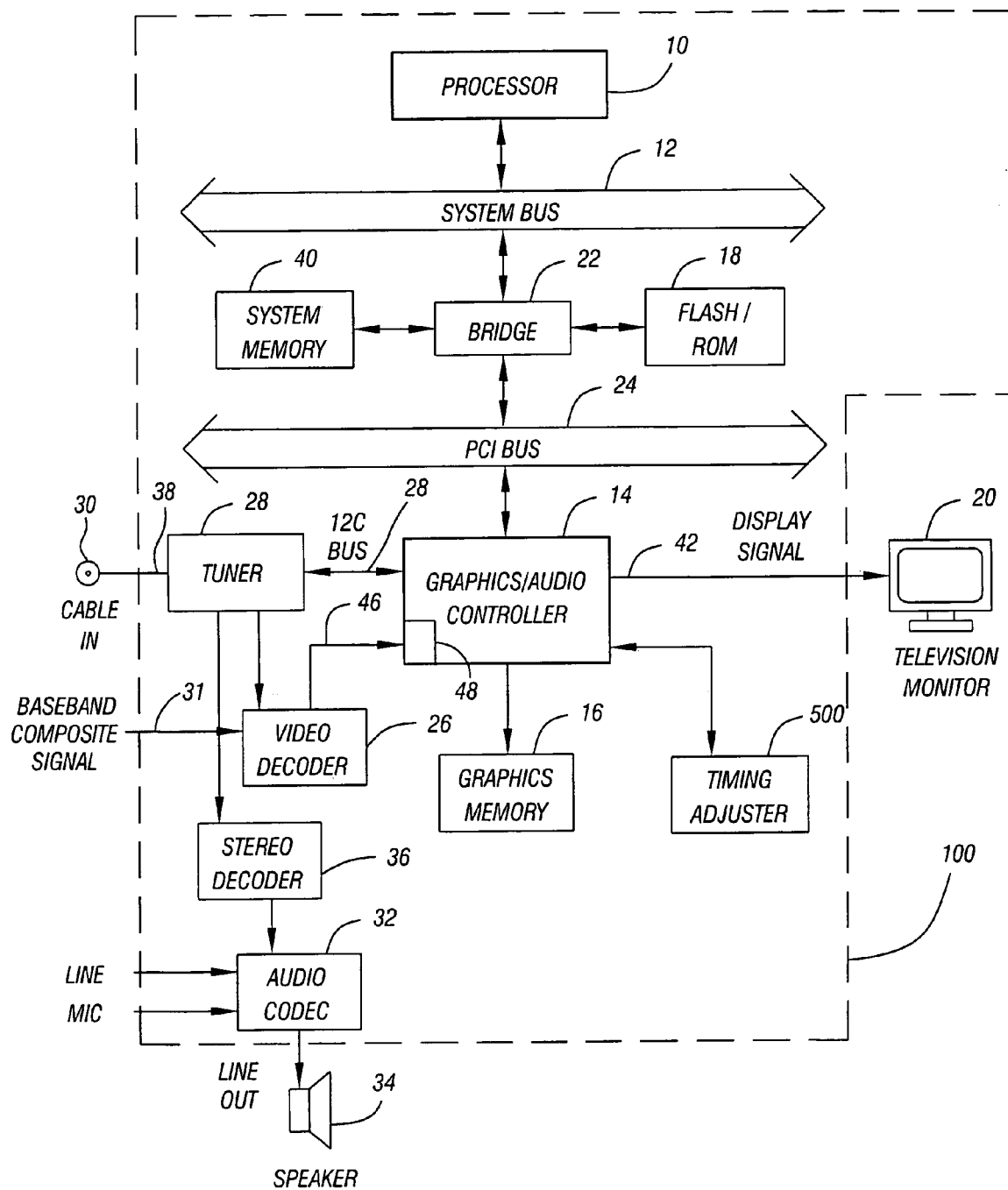
FIG. 1 is a block diagram of a processor-based implementation of the system according to one embodiment of the invention.

In FIG. 1, a block diagram of a system 100 includes a processor 10 connected to a system bus 12, according to one embodiment. The system 100 may be any of a variety of processor-based systems, including a personal computer, an Internet appliance, a set-top box, and so on.

A video signal 38 is received into the system 100 via a cable IN 30, and is presented to a television monitor 20 as a display signal 42. Set-top boxes typically enhance the incoming video signal 38 before presentation to the television monitor 20, such as by adding graphics images. Interactive features such as web page access simultaneous to video display may also be available in the set-top box. In one embodiment, the system 100 enhances the incoming video signal 38 before presentation to the television monitor 20.

A multi-function bridge 22 is connected to the system bus 12. The bridge 22 may itself include memory control functions. In one embodiment, the bridge 22 interfaces to a system memory 40 as well as a flash/ROM 18.

As examples, the memory 40 may be a random access memory (RAM) such as dynamic random access memory (DRAM), synchronous DRAM (SDRAM), static RAM (SRAM) or Rambus® DRAM (RDRAM), or any other medium that stores data. The flash/read-only memory (ROM) 18 may store one or more software programs, for execution by the processor 10.

Alternatively, the memory 18 may comprise a hard disk drive, a compact disk read-only memory (CDROM), or other non-volatile media. Or, the memory 18 may reside on a remote server (not shown), accessible to the system 100, such as through a network interface (not shown).

In one embodiment, the bridge 22 is further connected to a peripheral component interconnect (PCI) bus 24. The PCI Specification is available from The PCI Special Interest Group, Portland, Oreg. 97214. The PCI bus is a high-performance bus for connecting I/O processors, buses, controllers, and the like.

The system 100 further includes a graphics/audio controller 14, coupled to the PCI bus 24. In one embodiment, a Tvia CyberPro™ 5050 streaming media processor, suitable for set-top boxes and Internet appliances, available from Tvia Technologies, Inc., Santa Clara, Calif., is operable as the graphics/audio controller 14. Alternatively, graphics control and audio control may be made up of separate discrete elements.

The graphics portion of the graphics/audio controller 14 may include circuitry for performing a variety of video operations. The graphics/audio controller 14 may include a video capture engine for capturing incoming video to the frame buffer, a graphics engine for rendering graphics images in the frame buffer, a rasterizer, an alpha blender, a video mixer, a video scaler, a television encoder, a flicker filter, and other circuitry.

In one embodiment, the video signal 38 is an analog television signal transmitted by cable, satellite, terrestrial broadcast, or other RF transmission channel. The video signal 38 may be received into a tuner 28, which converts radio frequency (RF) signals into baseband composite video. Alternately, the incoming video signal 38 may be a baseband composite signal 31 received from an external device such as VCR or DVD player.

In one embodiment, the baseband composite video signal 31 is received by a video decoder 26, which decodes the baseband composite video signal 31 and digitizes the signal into luma and chroma image components. The video decoder 26 may further process the image components, such as by scaling, filtering, or performing other operations known to those of skill in the art, and produce a digitized video stream 46.

In one embodiment, the digitized video 46 is received into the graphics/audio controller 14 using a dedicated video port 48. The graphics/audio controller 14 may further process the image components, such as by scaling, filtering, or performing other operations known to those of skill in the art. The graphics/audio controller 14 may then send the digitized video 46 into the graphics memory 16, also known as frame buffer memory 16.

The frame buffer memory 16 is thus used as both a temporary storage and as a display memory, in one embodiment. Other video timing signals such as horizontal sync, vertical sync, and color burst, are not typically stored in the frame buffer memory 16, but instead are reconstructed by the graphics/audio controller 14 before being sent to the television monitor 20 as the display signal 42.

In one embodiment, a timing adjuster 500 is coupled to the graphics/audio controller 14. As described further below, the timing adjuster 500 enables the system 100 to avoid image shear and to maintain an acceptable color burst frequency such that the display signal 42 may be viewed on the television monitor 20. The timing adjuster 500 may be implemented using hardware logic, one or more software programs, or a hybrid of hardware and software.

In one embodiment, the system 100 further includes a stereo decoder 36. The stereo decoder 36 receives an intermediate frequency audio subcarrier signal from the tuner 28. The stereo decoder 36 decodes the signal into baseband audio signals in stereo, for receipt by an audio encoder/decoder (codec) 32. The audio codec 32 may connect to one or more speakers 34 that, in one embodiment, are external to the system 100.

Figure 2:
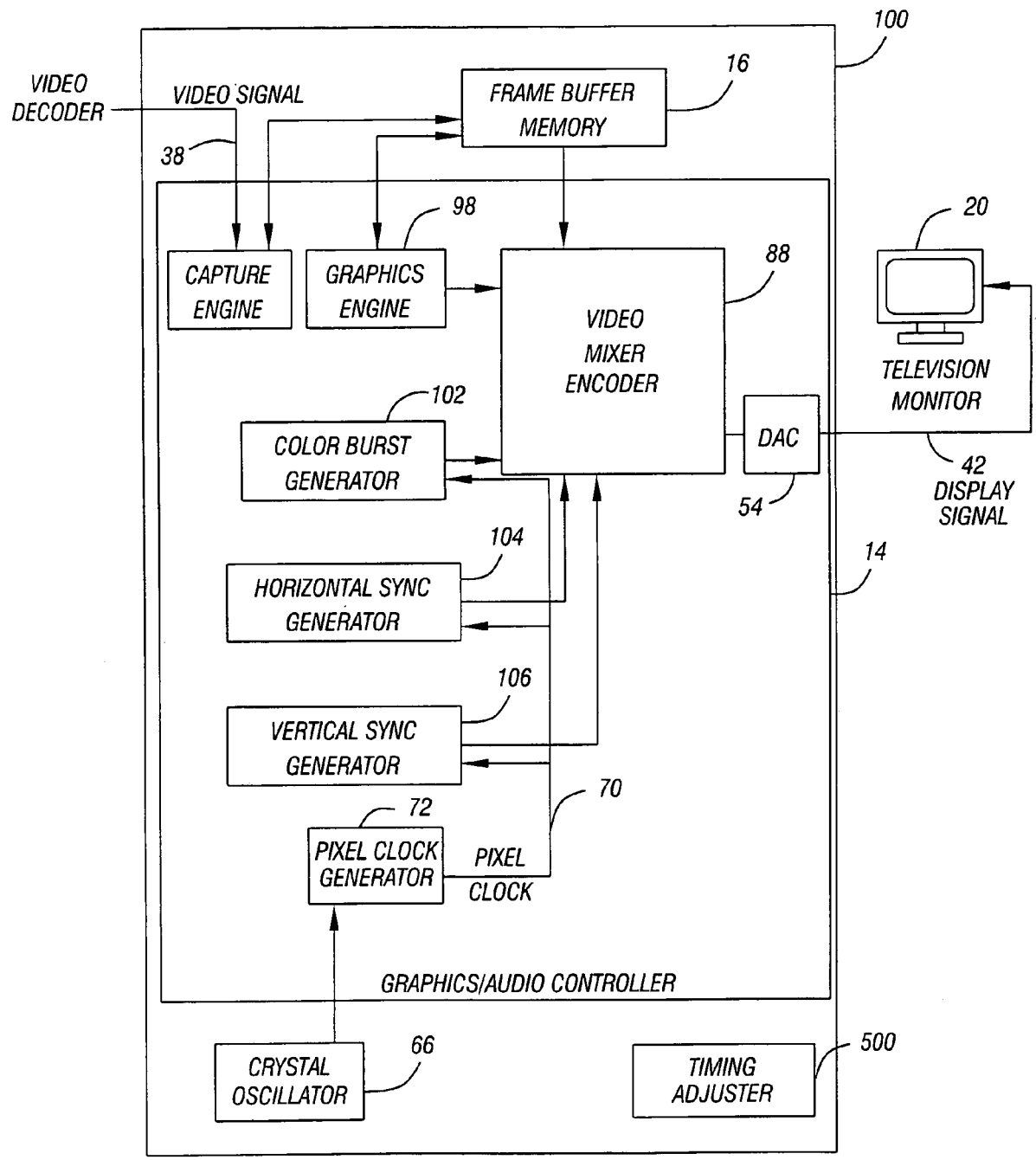
FIG. 2 is a block diagram of a system according to one embodiment of the invention.

Referring to FIG. 2, a block diagram of the system 100 of FIG. 1 includes a depiction of circuitry within the graphics/audio controller 14, according to one embodiment. The graphics/audio controller 14 may produce graphics images, known as personal computer (PC) graphics, from a graphics engine 98. One or more internally generated graphics signals may be mixed with the stored digitized video signal in a video mixer/encoder 88, to produce a rasterized data stream inside the video mixer/encoder 88. The rasterized data stream represents the combined video and graphics image.

When mixing the video signal 38 with graphics, the graphics/audio controller 14 may further process the image components, such as by scaling, filtering, color conversion, alpha blending, or other operations known to those of skill in the art.

For example, a graphics image may be superimposed on a video image such that both are visible simultaneously. Some television networks, for example, alpha-blend an identification icon with a programming signal such that the icon is transparently visible in the lower right-hand corner of the television monitor while the program is being broadcast.

As another example, a web page may contain PC graphics, with a small window displaying a down-scaled image of the incoming video. As yet another example, PC graphics may indicate TV channel change or volume change information, superimposed on the video image when the viewer uses a remote control device.

Regardless of image content, the term "display signal" is used throughout this document to identify any possible signal that is rendered suitable for receipt by the television display 20. To produce the display signal 42, the video mixer/encoder may further encode the rasterized data stream. After encoding, the rasterized data stream may be received into a digital-to-analog converter (DAC) 54, to produce the display signal 42. In one embodiment, the display signal 42 is an analog baseband composite signal suitable for receipt by the television display 20.

In one embodiment, the video mixer/encoder 88 inserts horizontal and vertical sync signals, and modulates the chroma data, using locally generated horizontal sync, vertical sync, and color burst signals. Accordingly, the graphics/audio controller 14 of FIG. 2 includes a color burst generator 102, a horizontal sync generator 104, and a vertical sync generator 106.

Regardless of image content, the display signal 42 is received by the television monitor 20, which, in one embodiment, is external to the system 100. The television monitor 20 includes a cathode ray tube (CRT), flat panel display, video projector, or other such component that converts the display signal 42 to a viewable image.

Figure 3A:
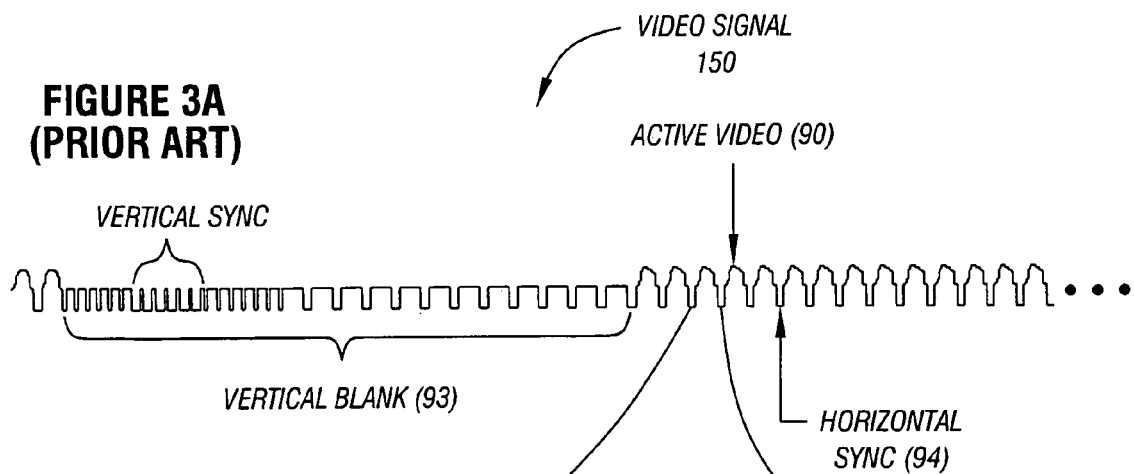
FIGS. 3A and 3B illustrate components of a video signal according to the prior art.
Figure 3B:
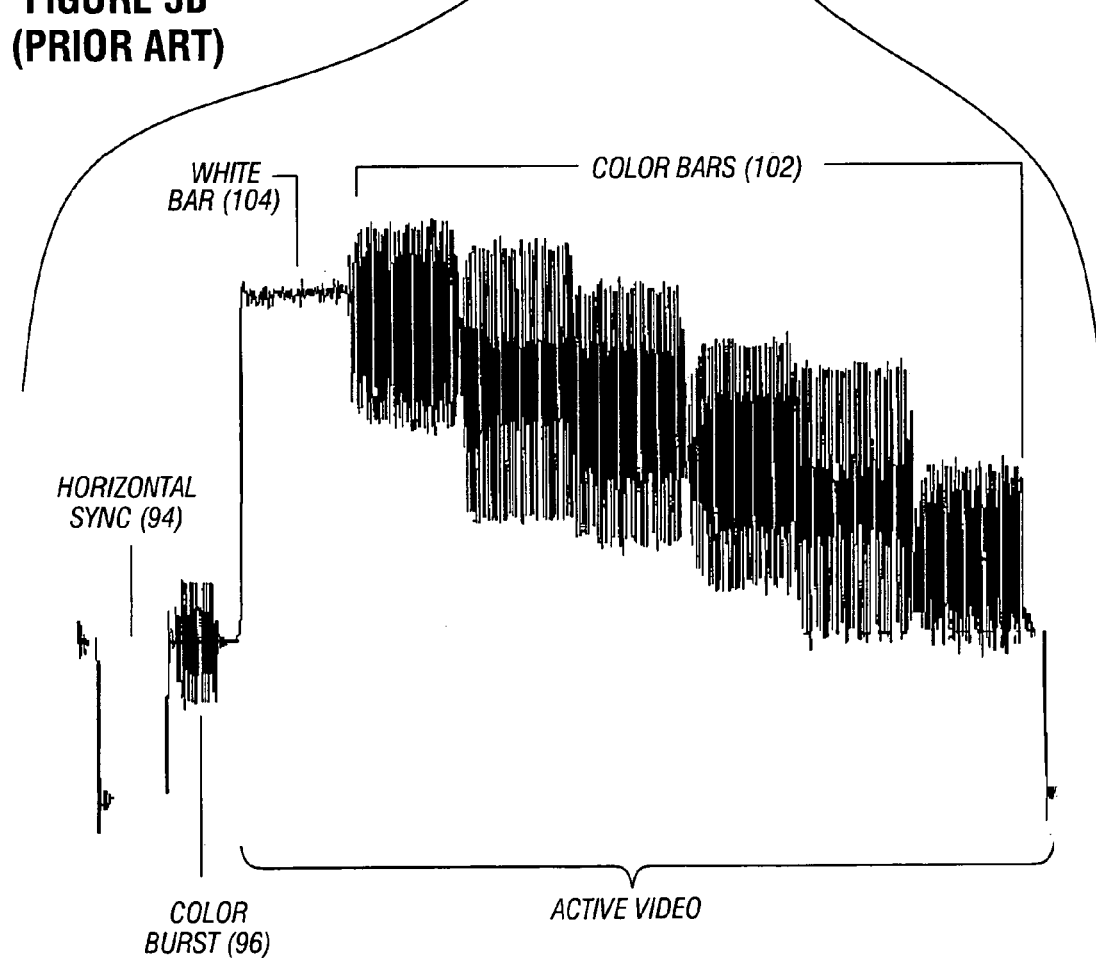

In FIGS. 3A and 3B, the components of a hypothetical video signal 150 include an active video portion 90, a vertical sync portion 92, a horizontal sync portion 94, and a color burst portion 96. The hypothetical video signal 150 may be the video signal 38 coming into the system 100 or the display signal 42 produced by the system 100, as examples. Each scan line of the hypothetical video signal 150 includes active video 90, horizontal sync 94, and color burst 96. Each field additionally includes vertical blanking interval (VBI) 93.

Within the VBI 93, the vertical sync 92 indicates and marks the beginning of a field. Additionally, the vertical sync 92 indicates when the electron beam retraces from the bottom to the top of the CRT of the television monitor 20. The vertical sync 92 is a group of three specially modulated scan lines with a low average DC level characteristic, which is easy to detect in television monitor or set-top box hardware. The specially modulated scan lines 92 are surrounded on each side by three lines of equalization pulses, for a total of nine vertical sync and equalization scan lines.

In between each active video 90, the horizontal sync 94 delineates each scan line and indicates when the electron beam of the monitor 20 retraces from the right to the left side of the CRT. The horizontal sync 94 is a sharp, rectangular low-going signal that appears at the beginning of every scan line.

In FIG. 3B, the active video 90 and the horizontal sync 94 are enlarged. The color burst 96 is inserted at the beginning of each new scan line, immediately following the horizontal sync 94. The color burst 96 allows a TV receiver (e.g., set-top box 100 or television monitor 20) to accurately demodulate the color difference signals from the sine and cosine components of a quadrature amplitude modulated (QAM) color subcarrier. The TV receiver demodulates the color information by phase-locking to the color burst 96. Because this operation may be performed for each television scan line, a distinct color burst 96 precedes each scan line of active video 90.

Looking back to FIG. 2, a timing reference, known as a pixel clock 70, enables the graphics/audio controller 14 to generate the horizontal sync 94, the vertical sync 92 and the color burst 96. The, pixel clock 70 is typically derived from a reference clock such as a crystal oscillator 66, which is fed into a pixel clock generator (PLL) 72, also in FIG. 4.

In one embodiment, the pixel clock 70 is fed into the color burst generator 102 to generate the color burst 96. The pixel clock 70 is also fed into the horizontal sync generator 104, to generate the horizontal sync 94, and into the vertical sync generator 106, to generate the vertical sync 92.

In one embodiment, the pixel clock generator 72 is a phase-locked loop device. A phase-locked loop (PLL) is a feedback system in which an output frequency is generated from a reference-frequency signal. PLLs work by setting up a ratio of frequencies of the output signal and the reference input signal. In one embodiment, the ratio for the pixel clock generator 72 is programmed by loading fixed-precision numbers into registers (not shown) of the graphics controller 14. The pixel clock generator 72 may generate a limited number of frequencies, based upon the precision of the numerator and the denominator ratio numbers.

Figure 4:
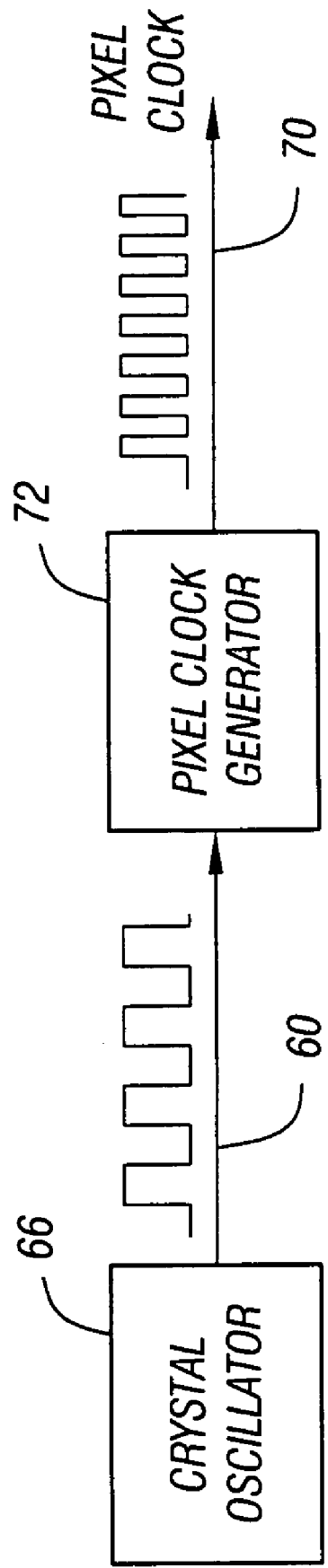
FIG. 4 is a block diagram of pixel clock circuitry of the system, according to the prior art.

Phase-locked loops may include analog circuitry, such as a voltage-controlled oscillator (VCO), digital logic devices such as an XOR gate or a J-K flip-flop, or a combination of analog and digital circuitry, to name but a few examples. Software PLLs are also available, for systems with sufficiently fast processors, such as some digital signal processing (DSP) systems. In FIG. 4, the pixel clock generator 72 allows a stable output frequency (pixel clock 70) to be generated from an input frequency (the clock 60 produced by the crystal oscillator 66).

The pixel clock 70 depends on the crystal oscillator 66 and the pixel clock generator 72 for stability. Where the crystal oscillator 66 exhibits small inaccuracies, the inaccuracies reflect through the pixel clock 70 and, consequently, may affect the accuracy of the color burst 96 as well as the vertical sync 92 and the horizontal sync 94.

Thus, according to one embodiment, the timing adjuster 500 of the system 100 (see FIGS. 1 and 2) adjusts the pixel clock 70 such that the color burst 96, horizontal sync 94, and vertical sync 92 signals are appropriately generated. By adjusting the pixel clock generator 72, the system 100 attains and maintains a suitable timing relationship of the display raster relative to the input video raster, such that image shear is gracefully avoided, despite changes in input video source (e.g., channel changes), and despite inaccuracies in the oscillator 66.

Image Shear

Figure 5:
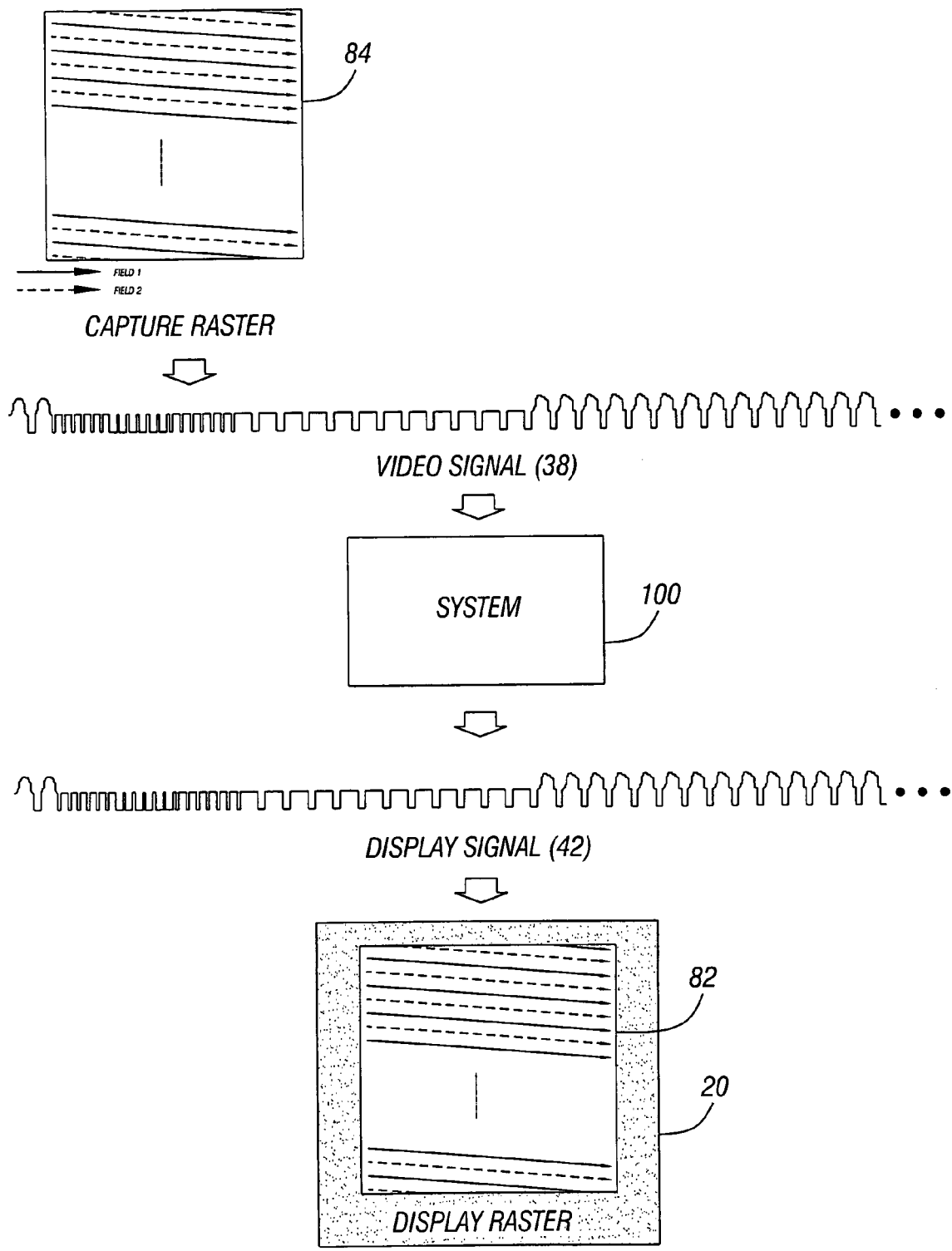
FIG. 5 is a diagram illustrating capture and display rasters in relation to the system according to one embodiment of the invention.

The relationship between the system 100 and the capture and display signals is depicted in FIG. 5. In one embodiment, the system 100 acts as an intermediary between the video signal 38 and the display signal 42. Capture into the frame buffer memory 16 follows the timing of the raster of the incoming video signal 38, shown as a capture raster 84.

In one embodiment, the capture raster 84 is generated remotely, e.g., outside the system 100. In contrast, the display signal 42 from the frame buffer memory 16 (as display raster 82) follows the raster timing generated locally by the graphics controller 16, which is referenced to the crystal oscillator 66. Because of these different time bases, when capturing and displaying video, the initial timing or phase relationship of the display raster 82 and the capture raster 84 is random, and is expected to drift continually during ongoing operation.

Following processing operations such as video scaling or combining with PC graphics, the display signal 42 is generated. The display signal 42 includes the manipulated active video 90, as well as newly generated horizontal sync 94, vertical sync 92, and color burst 96 signals. The display signal 42 is encoded, then sent to the television monitor 20 as a display raster 82. As with the capture raster 84, the display raster 82 includes two fields interlaced for display on the television monitor 20.

Figure 6A:
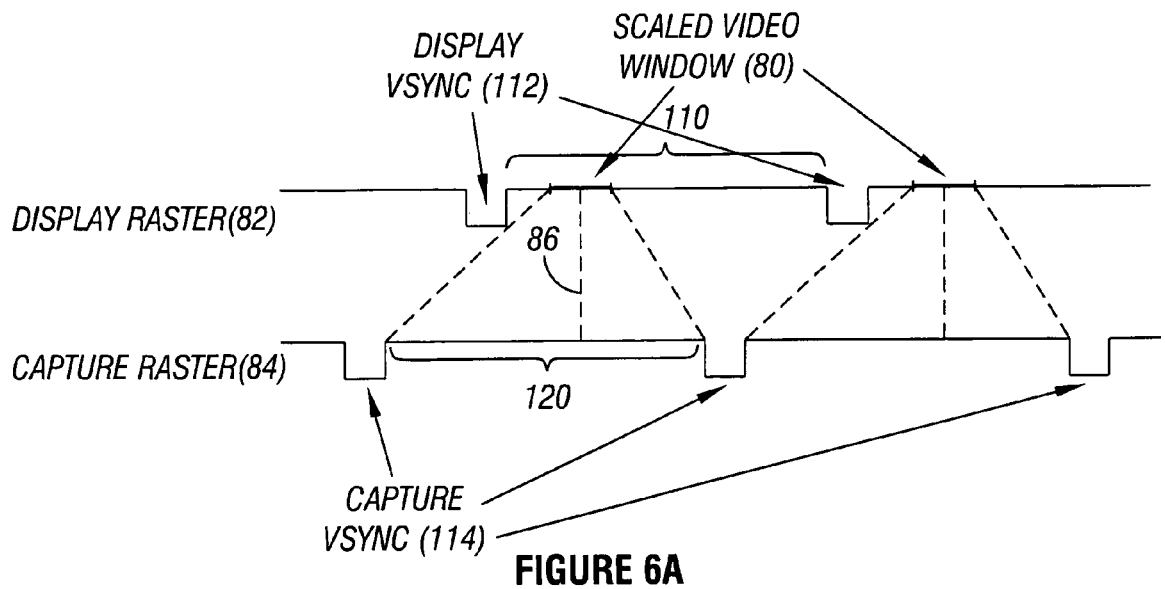
FIGS. 6A through 6C illustrate the phenomenon of image shear, according to one embodiment of the invention.
Figure 6B:
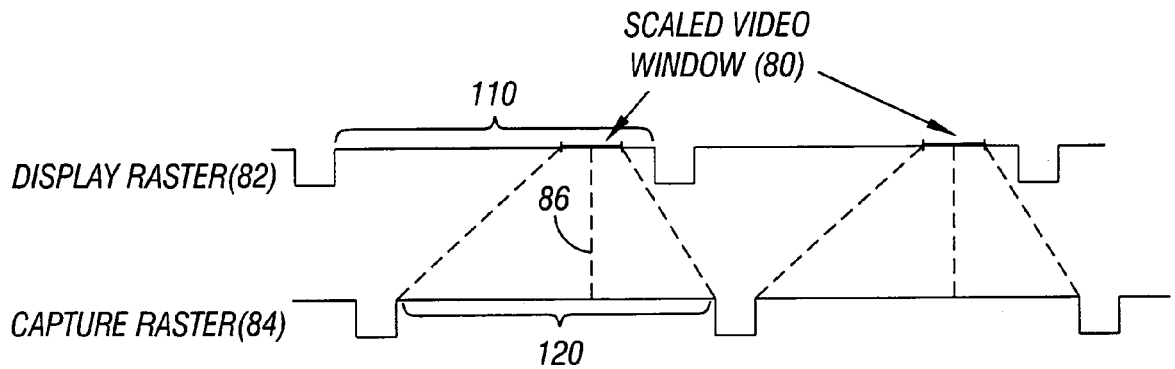
Figure 6C:
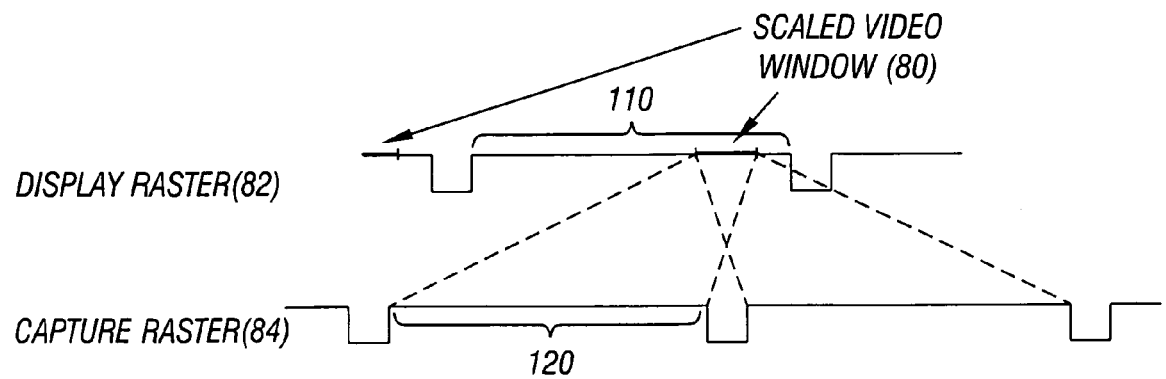

In FIGS. 6A through 6C, timing diagrams of the display raster 82 and the capture raster 84 illustrate the phenomenon of image shear when downscaling. The display raster 82 includes multiple display vertical sync (vsync) signals 112 while the capture raster 84 includes multiple capture vsync signals 114. Each of FIGS. 6A through 6C includes approximately two fields of capture and display raster timings.

Within a display field 110 (between two display vsync signals 112), a small scaled video window 80 is depicted. Dashed diagonal lines map the content/timing of the scaled video window 80 with the content/timing of a capture field 120 (between two capture vsync signals 114). In FIG. 6A, it is assumed that the display field 110 is at the same polarity, regarding odd and even fields, as the capture field 120.

The scaled video window 80 is close to the top of the display raster 82 (e.g., at the left of the display field 110). Due to the illustrated alignment of the display raster 82 and the capture raster 84, the scaled video window 80 is thus entirely within the timing of the capture field 120. When the scaled video window 80 begins being displayed, a capture engine has captured approximately half of the field contents. Since the scaled video window 80 is small, very quickly, the display of the scaled video window 80 "catches up" to the capture engine, and even "passes" the capture engine (at the vertical dashed line 86). The result is that old data is displayed at the bottom (e.g., right portion) of the scaled video window 80, thereby creating a horizontal shear (or tear) line.

In FIG. 6B, the scaled video window 80 is closer to the bottom of the display raster 82 (e.g., closer to the right end of the display field 110). However, due to the illustrated alignment of the display raster 82 and the capture raster 84, which is different from FIG. 6A, the scaled video window 80 has the same timing relationship to the capture raster 84 as in FIG. 6A. Consequently, the same horizontal shear line problem (again at the vertical dashed line 86) occurs. FIG. 6B, therefore, demonstrates that the relative timing of the scaled video window 80, not simply the position of the display raster 82, is relevant to whether image shear will occur.

In FIG. 6C, the scaled video window 80 is toward the bottom (e.g., right at the end of the display field 110) of the display raster 82, just as in FIG. 6B. However, due to the illustrated alignment of the display raster 82 and the capture raster 84, which is different from the alignment shown in FIG. 6B, the scaled video window 80 is not totally within the timing of the capture raster 84. The effect is that at no point does the scaled video window 80 "pass" the capture engine. Thus, no vertical dashed line may be made in FIG. 6C and no image shear is produced on the television monitor 20.

Using the information in FIGS. 6A-6C, in one embodiment, the timing adjuster 500 of the system 100 periodically monitors the timing relationship of the capture raster 84 and the scaled video window 80 within the display raster 82. If needed, the timing adjuster 500 modifies the pixel clock generator 72 to drive the display raster 82 into a relationship with the capture raster 84 that resembles FIG. 6C. In other words, the timing adjuster 500 modifies the display raster 82 such that the timing of the scaled video window 80 is partially or completely "outside" the timing of the active portion of the capture field 120.

For example, if the timing adjuster 500 detects a timing relationship of the scaled video window 80 and the capture raster 84 (see FIG. 6B), the timing adjuster 500 changes the frequency of the pixel clock 70 such that the display raster 82 moves slightly faster or slower, relative to the capture raster 84. This gradually shifts the relative timing of the scaled video window 80 and the capture raster 84 to be similar to that illustrated in FIG. 6C.

Those skilled in the art will recognize that other techniques, beyond modifying the pixel clock generator 72, may be used to change the display rate. For example, the frequency of the crystal oscillator 60 may likewise be modified by using a voltage controlled oscillator as a reference. As another example, if another PLL is in the reference frequency chain, it too could be modified. As another example, scan lines or pixels could be added or removed from the display raster, although experimentation has shown that this usually causes jumps in the display.

In one embodiment, the timing adjuster 500 finds the closest path for achieving the desired timing relationship of the scaled video window 80 and capture raster 84 by comparing the relative position against a "half-way" threshold. Depending on the results, the timing adjuster 500 adjusts the PLL registers to increase or decrease the frequency of the pixel clock 70. In this manner, the timing adjuster 500 expeditiously achieves a desired timing. To the observer, this makes the horizontal shear line appear to move upwards or downwards towards the closest edge of the video window, until the image shear disappears.

In one embodiment, the frequency of the pixel clock 70 is modified dramatically, such that the image shear is eliminated quickly, e.g., within 10 seconds. Recall that the color burst signal 96 depends on the pixel clock 70 to be accurately generated by the system 100. Unfortunately, dramatic adjustment of the pixel clock 70 forces the color burst signal 96 out of range of accurate color display by the television monitor 20. While a more modest adjustment might keep the color burst in an acceptable range, it eliminates the image shear only after a relatively long period of time, such as a minute or more. Because a viewer can readily see the image shear on the television monitor 20, such a modest adjustment is thus undesirable.

Thus, in one embodiment, the timing adjuster 500 compensates the color burst signal 96 such that color burst frequency 96 is maintained within range of accurate color display by the television monitor 20. Compensating the color burst signal 96 allows for a much greater deviation of the pixel clock 70 from nominal values. The result is that the horizontal shear line is much more quickly moved out of the scaled video window 80 without adversely affecting the color burst 96. Further, by periodically monitoring the relative raster positions, subsequent occurrences of image shear may be anticipated and avoided.

Overall Operation

Figure 7:
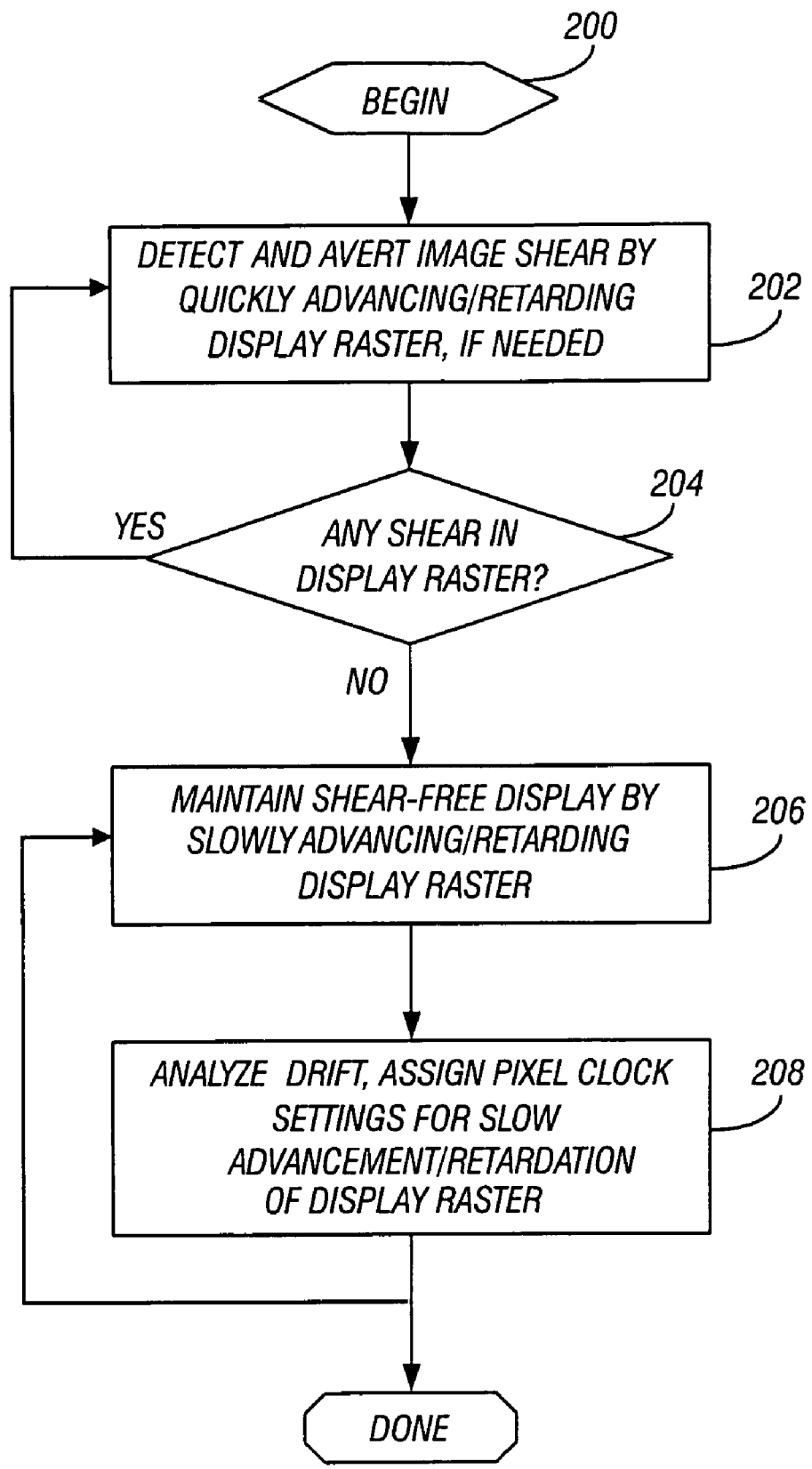
FIG. 7 is a flow diagram illustrating operation of the timing adjuster of FIG. 1 according to one embodiment of the invention.

Operation of the system 100, according to one embodiment, to monitor and adjust the timing relationship of the capture raster 84, when needed, is depicted in the flow diagram of FIG. 7. In a first phase of operation, the system 100 quickly advances or retards the display raster 82, as needed, to avert image shear problems (block 202 and diamond 204). This operation is described in more detail, below, in a section entitled "Detecting and Averting Image Shear," and in FIGS. 8, 9, and 10.

Once a shear-free display is achieved, the shear-free display is maintained by slowly advancing or retarding the display raster 82, as needed (block 206).

Further, in one embodiment, the system 100 continuously analyzes the drift, assigns pixel clock settings which will result in slow retardation or advancement for the display raster 82 (block 208), according to one embodiment, compensating for inaccuracies in the reference clock. These operations are described in more detail in a section entitled "Maintaining Shear-free Display and Good Color Burst," and in FIGS. 11, 12, and 13, below.

Detecting and Averting Image Shear

Figure 8:
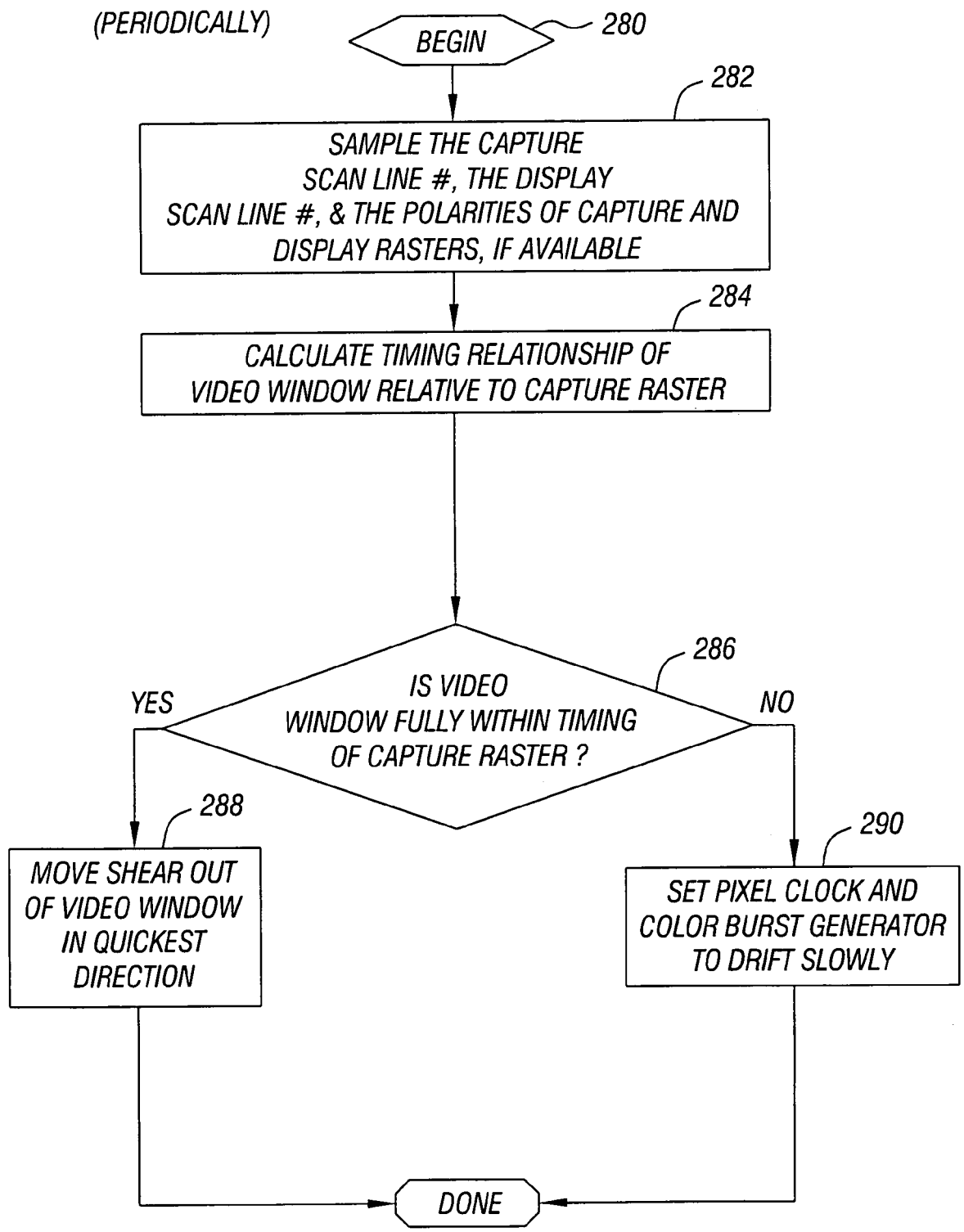
FIG. 8 is a flow diagram for detecting and averting image shear, according to one embodiment of the invention.

In FIG. 8, a flow diagram illustrates an operation of the timing adjuster 500 to quickly eliminate image shear without adversely affecting the color burst signal 96 (as in block 202 of FIG. 7). In one embodiment, the operations of FIG. 8 are performed periodically, such as every second (first sampling rate). A sample of the current scan line numbers for both the capture raster 84 and the display raster 82 is received by the timing adjuster 500 (block 282).

Where available from capture and display hardware, the field polarity information is also received. Including the field information provides for a much larger range of relative raster timing positions that are deemed acceptable for shear-free image display. In the absence of the field polarity information, the worst case may be assumed, which may cause otherwise unneeded rapid correction of the display raster 82.

When downscaling vertically during the capture process, the capture scan line count may indicate the number of scan lines actually captured. When downscaling, scan lines may be dropped according to a vertical downscaling ratio. Therefore, the sample value may be attenuated by the inverse of the vertical downscaling ratio relative to the scan line count of the unscaled raster of the input video signal 38.

For example, when downscaling by a 2:1 ratio, the sampled value might indicate "50" when the input video signal 38 reached its $100^{th}$ scan line of active video. The timing adjuster 500 compensates by multiplying the capture scan line sample value by the downscaling ratio, to result in a value which indicates the current raster timing of the unscaled input video signal 38.

Similarly, when upscaling during the display process, scan lines of captured video may be duplicated, resulting in compensation of the display scan line count by the timing adjuster 500. Those skilled in the art will recognize that other forms of compensation of the capture raster 84 and the display raster 82 may produce values that can be compared in a meaningful way to measure the timing relationships between the two.

For example, the display hardware may indicate the display raster position in terms of half-scan-lines, while the capture hardware may indicate the capture position in terms of whole scan lines. As another example, the display hardware may indicate the display raster as including inactive video scan lines occurring during the vertical blanking interval, whereas the capture hardware may indicate only a count of actively captured scan lines.

As another example, the display hardware may display progressive scan images, a full frame at a time, and indicate the display scan line accordingly, while the capture hardware may indicate a count of interlaced scan lines captured within a single field of an interlaced raster. Such indications would require suitable compensation, apparent to those skilled in the art, in order to be comparable.

The capture raster 84 has a "dead" zone, which is essentially the vertical blanking interval of the capture raster 84, during which no scan lines are captured. During this time, capture hardware may not provide a mechanism for determining the exact position of the capture raster 84. To avoid repeated samplings exclusively within this zone, in one embodiment, the period for sampling the capture raster 84 and the display raster 82 is not an exact multiple of the field time.

Referring back to FIG. 8, in one embodiment, the timing adjuster 500 receives information indicating the top and bottom edges of the scaled video window 80 within the display raster 82. From this information, and the current samples of display raster and capture raster timing position, the timing adjuster 500 calculates the timing relationship of the scaled video window 80 relative to the capture raster 84 (block 284).

From this information, it is possible to determine whether image shear is occurring, such as indicated by the vertical line 86 of FIGS. 6A and 6B. The timing adjuster 500 determines whether the scaled video window 80 begins after the beginning of the capture field 120 and finishes before the end of the capture field 120 (diamond 286), as illustrated in FIGS. 6A and 6B. Those skilled in the art recognize that the information regarding the top and bottom edges of the scaled video 80 may be received in different forms, and compared with the captured video in different forms.

For example, the top edge coordinate and height may be indicated, or alternately, separate coordinates for the top edge and the bottom edge may be indicated. Those skilled in the art recognize that the information regarding the top and bottom edges may be received in a form indicating the position within a progressive scan raster, whereas an interlaced raster is displayed. In such instances, the timing adjuster 500 may convert the information during analysis.

If the scaled video window is within the timing of the capture raster 84 (the "yes" prong of diamond 286), the system 100 quickly moves the image shear from the display raster 82, according to one embodiment (block 288). This operation is described in the flow diagram of FIG. 9.

Alternatively, if the scaled video window is not within the timing of the capture raster 84 (the "no" prong of diamond 286), the system 100 sets the pixel clock 70 and the color burst generator 102 to drift slowly (block 290), according to one embodiment. This operation is described in the flow diagram of FIG. 10.

Figure 9:
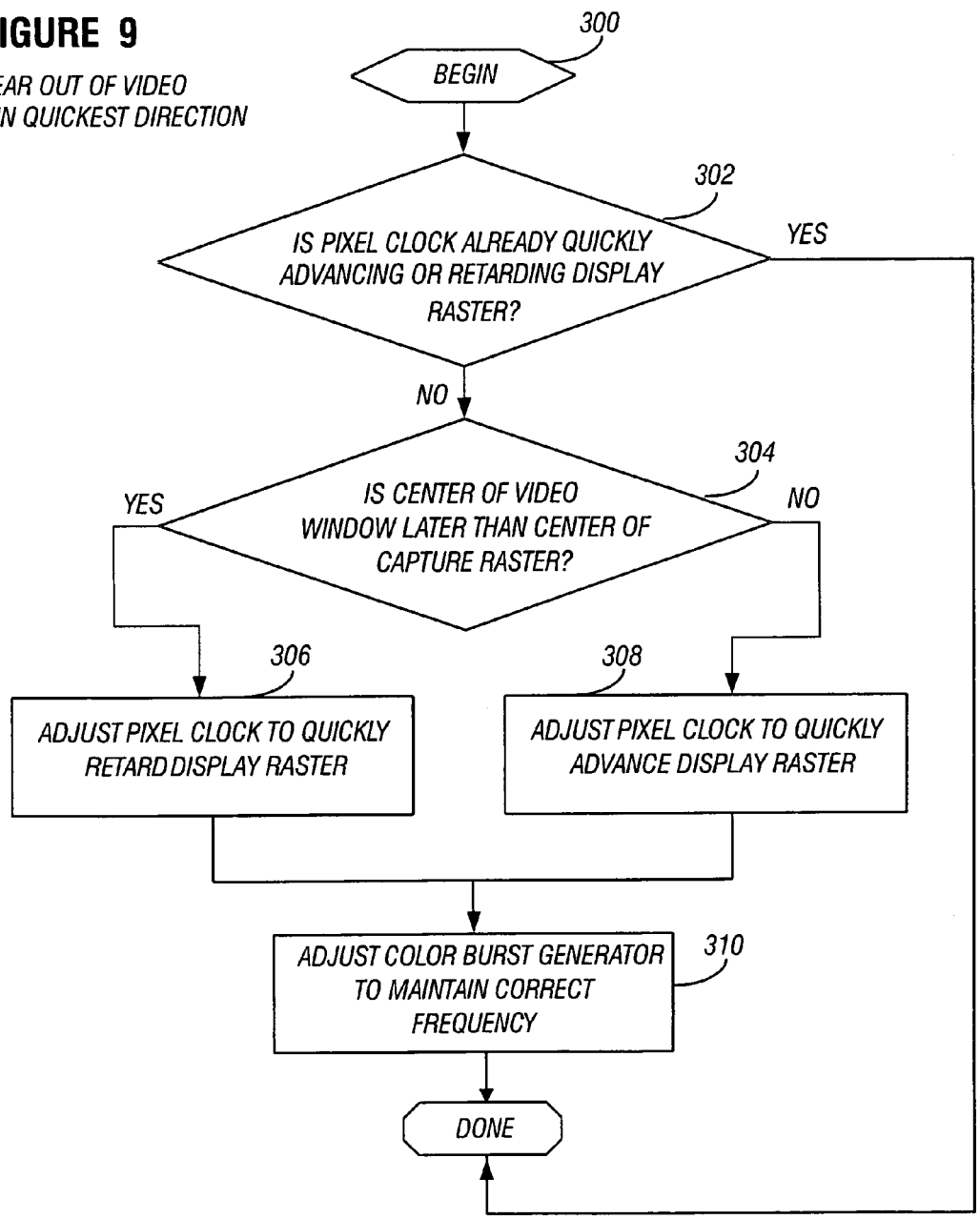
FIG. 9 is a second flow diagram involved with detecting and averting image shear, according to one embodiment of the invention.
Figure 10:
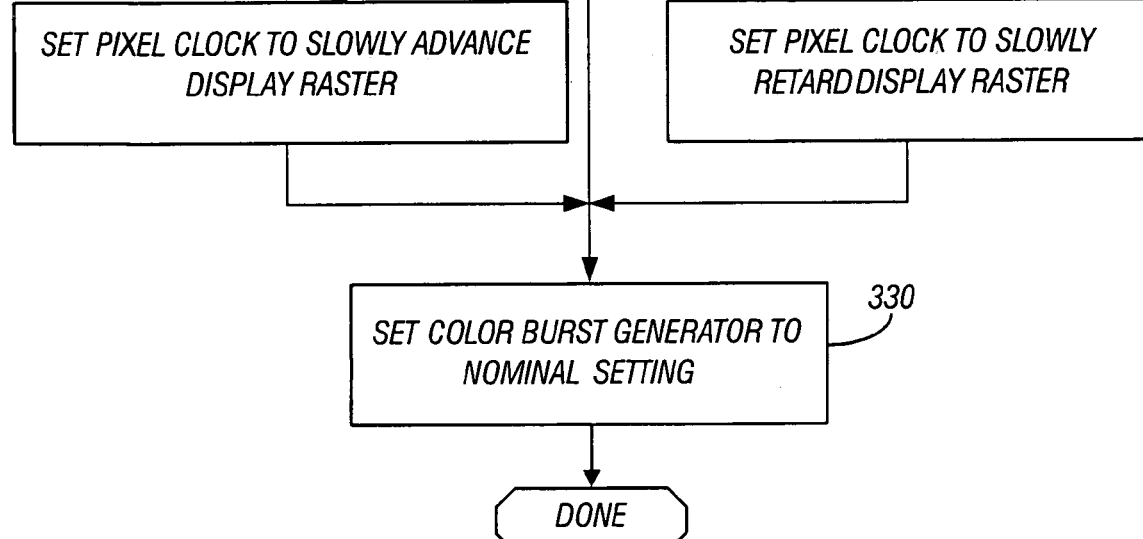
FIG. 10 is a third flow diagram involved with detecting and averting image shear, according to one embodiment of the invention.

In FIG. 9, a flow diagram depicts operations of the timing adjuster 500 according to one embodiment for quickly moving image shear out of the display raster 82. In one embodiment, the operations are performed approximately every 200 msec (second sampling rate). The timing adjuster 500 first determines whether the pixel clock 70 is already quickly advancing or retarding the display raster 82 (diamond 302). If so, no further action is taken by the timing adjuster 500.

Otherwise, in one embodiment, a determination is made by timing adjuster 500 as to whether speeding or slowing the display raster 82 provides the quickest way to move the image shear line 86 (see FIGS. 6A and 6B) out of the scaled video window 80. The timing adjuster 500 compares the timing of the vertical center of the scaled video window 80 with the timing of the vertical center of the captured video raster 84 (diamond 304). If the center of the scaled video window 80 is later than the center of the captured video raster 84 (the "yes" prong of diamond 304), the timing adjuster 500 decreases the frequency of the pixel clock 70. This thereby retards the display raster 82, to move the image shear line 86 toward the bottom of the scaled video window 80 (block 306).

Conversely, if the center of the scaled video window 80 is earlier than the center of the captured video raster 84 (the "no" prong of diamond 304), the timing adjuster 500 increases the frequency of the pixel clock 70, and thereby advances the display raster 82, to move the image shear line 86 toward the top of the scaled video window 80 (block 308).

To avoid image shear, it is sufficient to move only one edge of the scaled video window 80 outside the timing of the capture raster 84, according to one embodiment. The timing adjuster 500 may stop the rapid movement of the shear line at exactly the threshold of such timing, and momentarily achieve a shear-free display.

In one embodiment, however, an extra hysteresis zone is provided, in which the rapid movement continues until the video window edge is a number of scan lines (e.g., 10) past the timing of the capture raster 84. When returning to slow raster movement (see below), the timing adjuster 500 need not precisely know the characteristics of the crystal oscillator 66. Before self-calibration occurs (see below), it may not be known exactly what PLL settings would slowly advance or retard the display raster 82. The hysteresis zone allows the raster movement to proceed in the opposite direction of the rapid movement for a short while until the timing adjuster 500 calibrates itself to the characteristics of the crystal oscillator 66.

When actively moving the display raster 82, the timing adjuster 500, according to one embodiment, samples the raster positions more often than the first sampling rate (see block 282 of FIG. 8). In one embodiment, an accelerated sampling rate (second sampling rate) minimizes overshoot after a desired raster timing is achieved. Once a shear-free raster timing is achieved, the timing adjuster 500 reverts to the first sampling rate. In one embodiment, the first sampling rate is not an exact multiple of the field time. The shorter sampling period (second sampling rate) is approximately five times as often as the longer sampling period (first sampling rate).

In one embodiment, the timing adjuster 500 utilizes a table of pre-determined PLL parameters, including numerator, denominator, and multiplier values. Included in the table may be entries pre-determined to cause rapid advance of the display raster 82, entries pre-determined to cause rapid retardation of the display raster 82, and entries pre-determined to cause slow movement of the display raster 82.

In one embodiment, the exact nature of the slow movement is unknown until the timing adjuster 500 has calibrated the raster movement versus an incoming video signal (see below). For a given PLL setting that would be accurate given an exactly accurate reference clock frequency, tolerances in the crystal oscillator 66 may produce slow advancement of the display raster 82 in one instance of the set top box 100, while in another instance, may produce slow retardation of the display raster 82.

Returning to FIG. 9, after adjusting the pixel clock 70, the timing adjuster 500 adjusts the color burst generator 102 such that the color burst 96 (see FIG. 3B) is appropriately generated (block 310). In one embodiment, the table of predetermined PLL parameters also includes frequency error information which may be combined with calibration data and from which color burst adjustment may be calculated.

In one embodiment, timing adjuster 500 changes the pixel clock generator 72 and color burst generator 102 register sets during the vertical blanking interval (VBI) of the display raster 82, in order to minimize any visual artifacts as the pixel clock generator 72 re-locks to the new parameters. In one embodiment, the pixel clock generator 72 and the color burst generator 102 are adjusted in an interrupt service routine, which is executed in response to a hardware interrupt generated by the graphics/audio controller 14 at vertical retrace time.

Returning to FIG. 8, the system 100 moves image shear out of the video window in the quickest direction (block 288) according to the operations of FIG. 9.

Once the timing generator 500 determines that the scaled video window is not fully within the timing of the capture raster 84 (the "no" prong of diamond 286), and therefore not exhibiting image shear, the timing adjuster 500 sets the pixel clock 70 and the color burst generator 102 such that the display raster 82 drifts slowly (block 290). These operations are described in FIG. 10.

First, according to one embodiment, the timing adjuster 500 determines whether the display raster 82 is quickly advancing or retarding (diamond 322), as a leftover effect of rapidly moving the shear line. If quickly advancing, the pixel clock 70 is adjusted to slowly advance the display 82 (block 326). If quickly retarding, the pixel clock 70 is adjusted to slowly retard the display 82 (block 328).

If neither quickly advancing nor quickly retarding, then the image was shear-free at the beginning of the process, and no aversion was necessary. In this case, the pixel clock 70 is left alone (block 324), to continue the display raster's slow drift in the current direction.

Once a determination is made whether to adjust the pixel clock 70, the color burst generator 102 is adjusted to a nominal setting (block 330), according to one embodiment.

When drifting slowly within the acceptable timing range, the timing adjuster 500 sets the color burst generator 102 to its nominal default setting, assuming an exactly accurate crystal oscillator 66. The default setting is maintained even though pixel clock PLL settings may be changed, thereby changing the color burst frequency. Even though color burst frequency changes are not desirable in and of themselves, the default setting of the color burst generator 102 maintains a phase lock of the color burst to the horizontal sync of the display signal 42. In one embodiment, locking the color burst to the horizontal sync minimizes visual anomalies such as "crawling dot." The process described below keeps the color burst signal within an acceptable tolerance range for successful display by the TV monitor 20.

Thus, operations to set the pixel clock 70 and the color burst generator 102 to drift slowly are complete.

Maintaining Shear-Free Display and Good Color Burst Frequency

Referring back to FIG. 7, after solving any image shear problem, the system 100 maintains a shear-free display (see the "no" prong of diamond 204). Once a shear-free raster timing position is initially achieved or detected, timing adjuster 500 maintains the shear-free condition by causing the display raster 82 to drift slowly within an acceptable range of raster timing position. In one embodiment, the timing adjuster 500 monitors the positions of the capture raster 84, the display raster 82, and the scaled video window 80 on an ongoing, periodic basis.

From the information monitored, the timing adjuster 500 adjusts the pixel clock pixel clock generator 72 to adjust the frequency ratio slightly higher or lower, as needed, to maintain an acceptable raster timing relationship for shear-free display. In one embodiment, the adjustment causes the display raster 82 to alternately advance or retard slowly relative to the capture raster 84. When the raster timing position reaches the edge of the acceptable timing range for shear-free display, the timing adjuster 500 reverses the direction of the drift.

Figure 11:
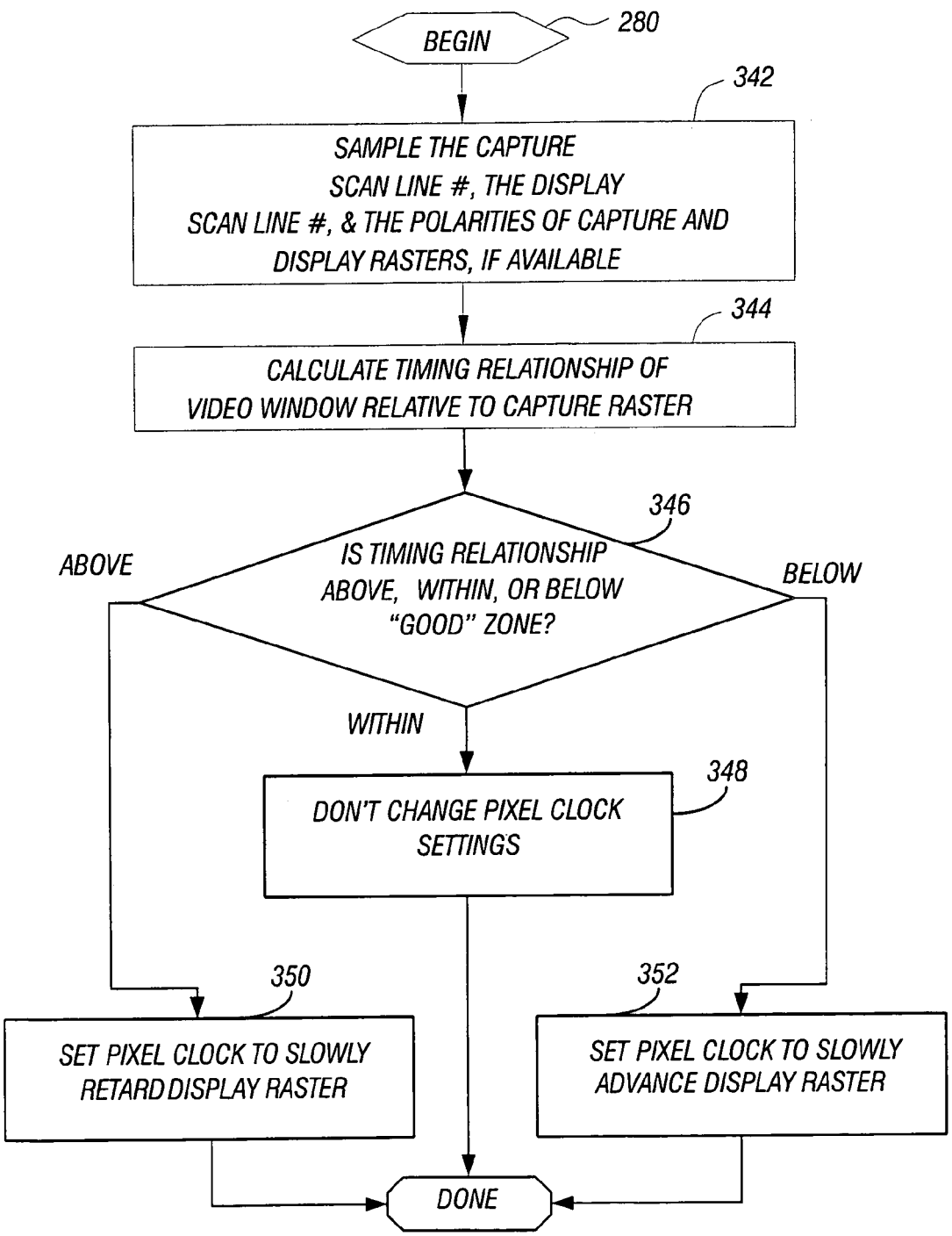
FIG. 11 is a flow diagram for maintaining a shear-free display according to one embodiment of the invention.

The operation of the timing adjuster 500 to maintain a shear-free display, according to one embodiment, is depicted in the flow diagram of FIG. 11. The timing adjuster samples the capture and display scan line numbers, as well as the polarities of the capture raster 84 and the display raster 82, if available (block 342). Using this information, the timing adjuster 500 calculates the timing relationship of the scaled video window relative to the capture raster 84 (block 344).

Depending upon the timing relationship, the timing adjuster 500 may modify the pixel clock 70 to slowly retard the display raster 82 (block 350), to slowly advance the display raster 82 (block 352), or to leave the pixel clock 70 untouched (block 348).

While monitoring the relative timing position of the capture raster 84 and the scaled video window 80, the timing adjuster 500 also monitors the overall rate of drift of the display raster 82 relative to the capture raster 84, for the current PLL setting. Based on the calibration, the timing adjuster 500 may select a new PLL setting to minimize both raster drift and inaccuracy of the color burst resulting from tolerances in the crystal oscillator 66.

As indicated above, in one embodiment, each step of pixel clock generator 72 frequency is one of several sets of numerator, denominator, and multiplier values. These values form a group of closely spaced discrete frequency possibilities for the pixel clock generator 72. The values may be represented in a table of PLL settings, as described above. In one embodiment, the PLL values that produce the least relative movement between the capture raster 84 and the display raster 82, assuming that the crystal oscillator 66 is exactly accurate, are deemed the initial default values for the pixel clock generator 72.

The timing adjuster 500 selects a group of two or three neighboring PLL value sets within the table. In one embodiment, three PLL value sets, an upper set, a middle set, and a lower set, are selected, with the middle set designated as the initial default setting. The upper set includes higher frequency values relative to the middle and lower sets. Initially, when beginning maintenance of a shear-free display, the timing adjuster 500 uses the upper set to advance the display raster 82 slowly, or the lower set to retard the display raster 82 slowly.

In one embodiment, the table of PLL settings also includes information regarding the frequency error of each setting versus the ideal pixel clock frequency, assuming an exactly accurate crystal oscillator 66. Those skilled in the art will recognize that this information can take many forms, and corresponds to the expected drift rate of the display raster 82 versus the capture raster 84 of the incoming video signal 38.

While drifting slowly to maintain shear-free display, the timing adjuster 500 periodically monitors and estimates the actual rate of drift. The timing adjuster 500 further searches for the PLL setting which would best compensate for this estimated rate of drift, based on the frequency error information in the table. The procured PLL setting may become the new default setting, and the timing adjuster 500 uses its upper or lower value set to advance or retard the display raster 82.

In one embodiment, timing adjuster 500 may determine that the default setting clearly advances (or conversely, retards) the display raster 82. In this case, the default setting may also serve as the setting with which the timing adjuster 500 advances (or conversely, retards) the display raster 82. This determination is made based on the frequency error expected when using the new default pixel clock generator 72 setting to compensate for the estimated actual drift.

Since the pixel clock generator 72 generates discrete frequencies, the closest match for generating an accurate pixel clock 70 will likely not generate an exactly accurate pixel clock 70. In some cases, the estimated frequency error of the closest match may be large enough to overshadow pre-determined uncertainties in the measurement of the actual rate of drift. Those skilled in the art will recognize that these uncertainties arise from uncertainties in the exact time span of the monitoring period, quantization of the measurement of the capture and display rasters (especially the capture raster, with which quantization may be exacerbated due to line dropping during downscaling), and similar concerns.

Figure 12:
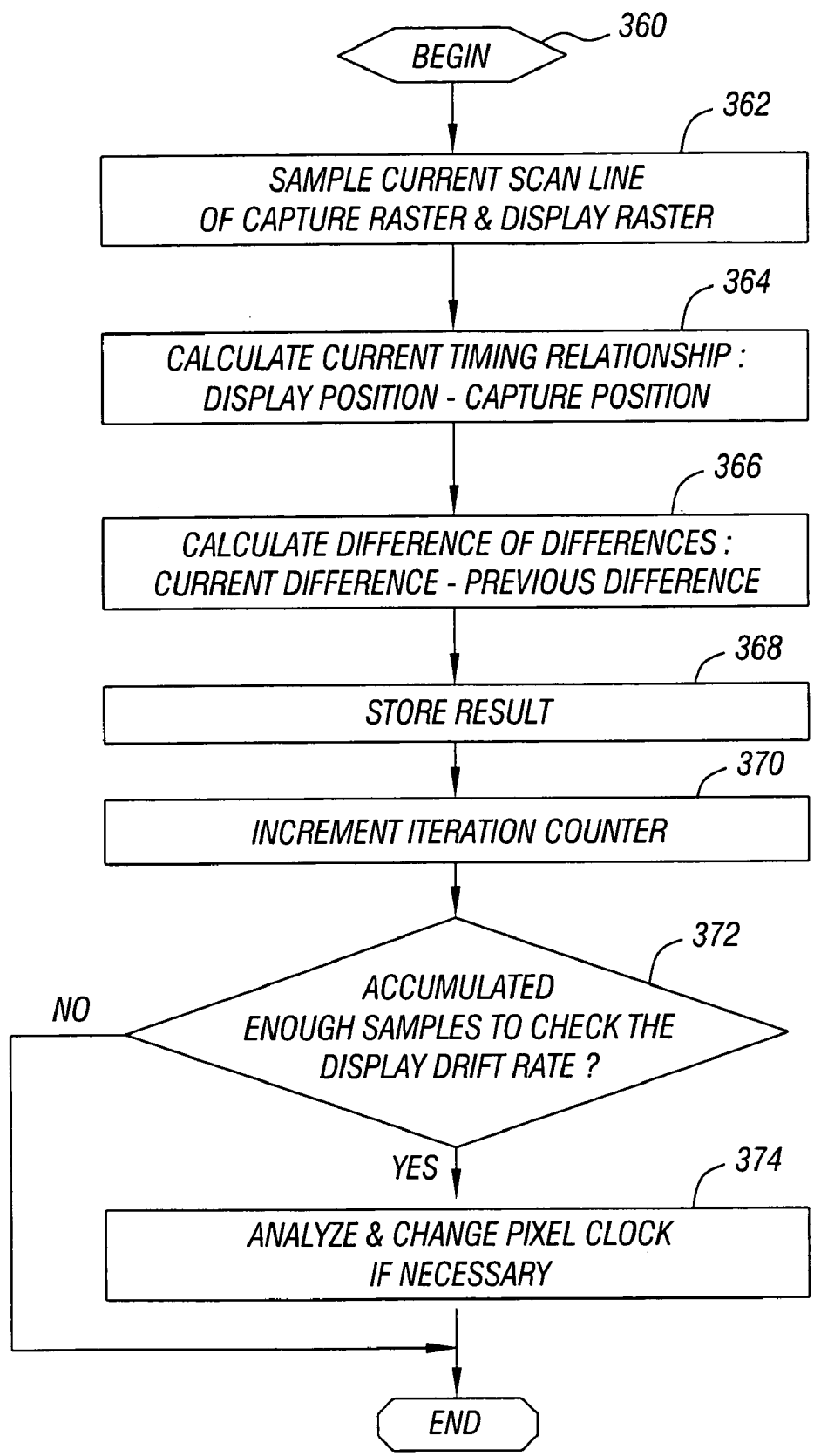
FIG. 12 is a flow diagram to determine whether pixel clock adjustment is made, according to one embodiment of the invention.

The operation of the timing adjuster 500, according to one embodiment, when monitoring the actual rate of drift, and selecting the group of two or three PLL settings, is illustrated in the flow diagram of FIG. 12. In one embodiment, the operations of FIG. 12 are performed once every second.

The current scan line of the capture raster 84 and the current scan line of the display raster 82 are retrieved (block 362). This operation is the same as when monitoring the capture raster 84 and the display raster 82 for image shear avoidance (see block 282 of FIG. 8). The actual values read from hardware may need compensation, as discussed above, so that the capture and display values may be compared. A difference between the retrieved scan lines is calculated (block 364). This information, the timing relationship between the capture raster 84 and the display raster 82, is stored by the timing adjuster 500 in the memory 16 or in a local memory within the graphics/audio controller 14.

In one embodiment, a previous position difference, also stored in the memory 16, is retrieved and compared to the current position difference (block 366) to yield a difference of differences result, which represents the drift rate of the display raster 82 relative to the capture raster 84. The difference of differences calculation is then accumulated and stored (block 368) with prior difference of difference calculations. An iteration counter (block 370) identifies the number of samples that are accumulated.

In one embodiment, multiple position differences are stored, each spanning several sampling/monitoring periods. This enables multiple difference of difference calculations to be made. In one embodiment, four position differences are stored, spanning four sampling/monitoring periods. This provides for more accuracy in the drift rate estimate.

In one embodiment, a check is made to determine whether a sufficient number of calculations have been accumulated (diamond 372). In one embodiment, eight samples are considered sufficient. Once a sufficient number of samples are available, the data is analyzed such that the pixel clock 70 may be changed (block 374). The operations of FIG. 12 are repeated periodically, such as once every second.

The analysis of the accumulated samples (block 374 of FIG. 12) may also be performed by the timing adjuster 500, as in FIG. 13. An average rate of change is calculated (block 382). The average rate of change is equivalent to the first derivative of the positional difference, or drift, of the capture raster 84 and the display raster 82. In one embodiment, the accumulated difference of differences, stored in the memory 16 or in local memory, is divided by the iteration count (see block 370 of FIG. 12) already stored by the timing adjuster 500.

In one embodiment, timing adjuster 500 then converts the drift estimate to an estimate of the error of the actual pixel clock frequency versus the ideal frequency of the pixel clock 70 for no drift (block 384). For example, in one embodiment, a drift estimate is calculated in terms of half scan lines over four monitoring periods, where each monitoring period is 1010 msec in duration.

Where the display raster 82 is phase-alternate line (PAL), and using "square" pixels, for example, the pixel clock frequency for the display raster 82, in one embodiment, is 29.500 MHz, with an actual pixel display rate of 14.750 MHz. With these characteristics, there are 944 pixels (including 768 active/visible and 176 inactive/blanked pixels) per scan line, or 944 pixel clock periods per half-scan-line. The following formula, in which "HSL" stands for "half-scan-lines", converts the drift rate estimate into Hertz:

$$DriftInHz = \frac{DriftInHSLPer4Pds}{4 \text{ periods}} * \frac{1 \text{ period}}{1010 \text{ msec}} * \frac{1000 \text{ msec}}{1 \text{ sec}} * \frac{944 \text{ clocks}}{HSL}$$

The drift rate estimate relates to the pixel clock 70. Those skilled in the art will recognize that several other mechanisms for estimating the drift exist. Indicia such as the error of one or more of the following: the reference clock, the burst generator, the scan line rate, the field rate, etc., may be used, for example, to estimate the drift.

In one embodiment, the timing adjuster 500 takes into account the frequency error information in the table for the current PLL setting. Recall that the frequency error indicates the error in Hz for the PLL setting with an exactly accurate oscillator clock 66. For example, if a certain PLL setting produced a frequency of 29.500384 MHz, using a crystal oscillator 66 of exactly 24.576000 MHz, the table would contain the value 384. Error of the pixel clock 70 is calculated as follows:

$$ErrorInHz = DriftInHz - CurrPLLExpectedDrift$$

The timing adjuster 500 may search the PLL settings table for the best default setting, comparing the inverse of ErrorInHz (−ErrorInHz) with the error values in the table (block 386). In one embodiment, the closest match becomes the default lowest drift PLL setting.

In searching for the closest match, the timing adjuster 500 calculates the absolute value of the difference between −ErrorInHz and the error value in the table entry for the new default pixel clock generator 72. If this value is greater than a pre-determined threshold, overshadowing uncertainties in the periodic raster sampling, then the new default pixel clock generator 72 entry may be deemed as clearly advancing or retarding the display raster 82 (diamond 388).

In one embodiment, the timing adjuster 500 assigns PLL settings as the slowly advancing, default, and slowly retarding settings used when maintaining an acceptable timing relationship between the capture raster 84 and the display raster 82 for shear-free display.

If the default setting clearly advances the display raster 82, the default and slowly advancing settings can be the same (block 390). At the other end, if the default setting clearly retards the display raster 82, the default and slowly retarding settings can be the same (block 400).

By adjusting the pixel clock 70 to minimize the drift between the capture raster 84 and the display raster 82, the pixel clock generator 72 may generate a reasonably accurate pixel clock 70 (block 402). Using the methods of FIGS. 12 and 13, the pixel clock 70 essentially references the incoming video signal 38. The system 100, in turn, maintains the integrity of the image displayed on the television monitor 20.

Particularly for cost-sensitive set-top boxes, the timing adjuster 500 permits wider tolerances of the crystal oscillator 66, and therefore cheaper oscillator component costs, as well as allowing wider temperature ranges of useful operation of the system 100.

The process illustrated in FIGS. 12 and 13 continues as long as there is a valid video signal 38 received into the system 100. After resetting the averaging process, such as when changing sources for input video 38, or when starting or restarting video capture after a period of no video capture activity, a sufficient number of samples are taken each time to ensure an accurate representation of the first derivative. In one embodiment, twelve samples are considered a sufficient number.

If there is no valid video signal 38, and the timing adjuster 500 has not had an opportunity to select a "best" default PLL setting, a pre-determined default PLL setting is used by the timing adjuster 500. In one embodiment, if a valid video signal is present long enough for the timing adjuster 500 to select a new default PLL setting, the new default setting is used if and when the valid video signal 38 is lost. This preserves the best estimate for an accurate color burst signal, even when no video is present.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    determining a timing relationship between a video window and a capture raster, wherein the video window is within a display raster; and
    adjusting a pixel clock so that the video window is not fully within the timing of the capture raster.

2. The method of claim 1, further comprising:
    determining that the video window is within the timing of the capture raster; and
    quickly moving image shear out of the video window.

3. The method of claim 1, further comprising:
    setting a color burst generator to phase-lock within the display raster.

4. The method of claim 3, setting a color burst generator to phase-lock within the display raster further comprising setting the color burst generator to a predetermined nominal setting.

5. The method of claim 2, quickly moving image shear out of the video window further comprising:
    determining that the video window is later than the capture raster; and
    adjusting the pixel clock to quickly retard the display raster.

6. The method of claim 5, further comprising:
adjusting a color burst generator to maintain a viewable image on the display raster.

7. The method of claim 6, further comprising:
retrieving frequency error information from a table of predetermined phase-locked loop parameters; and
calculating a color burst adjustment using the frequency error information.

8. The method of claim 2, quickly moving image shear out of the video window further comprising:
determining that the video window is earlier than the capture raster;
adjusting the pixel clock to quickly advance the display raster; and
adjusting a color burst generator to maintain a viewable image on the display raster.

9. The method of claim 1, setting the pixel clock to cause the display raster to drift further comprising:
determining that the pixel clock is quickly advancing the display raster; and
setting the pixel clock to slowly advance the display raster.

10. The method of claim 1, setting the pixel clock to cause the display raster to drift further comprising:
determining that the pixel clock is quickly retarding the display raster; and
setting the pixel clock to retard the display raster.

11. The method of claim 1, further comprising determining a capture raster scan line number.

12. The method of claim 11, further comprising determining a display raster scan line number.

13. The method of claim 12, further comprising:
determining a capture raster field polarity; and
determining a display raster field polarity.

14. The method of claim 1, determining a timing relationship between a video window and a capture raster further comprising:
periodically monitoring the capture raster and the display raster.

15. The method of claim 14, wherein the monitoring period is not an exact multiple of a field time.

16. The method of claim 1, adjusting a pixel clock to avert shear of the video window further comprising:
identifying a vertical retrace period; and
invoking an interrupt service routine to adjust the pixel clock.

17. An article comprising a medium storing instructions that if executed enable a system to:
calculate a timing relationship between a video window and a capture raster, wherein the video window is within a display raster; and
adjust a pixel clock so that the video window is not within the timing of the capture raster.

18. The article of claim 17, wherein the instructions further enable the system to:
determine that the video window is within the timing of the capture raster; and
quickly move image shear out of the video window.

19. The article of claim 17, wherein the instructions further enable the system to:
set a color burst generator to phase-lock to the display raster.

20. The article of claim 19, wherein the instructions further enable the system to:
set the color burst generator to a predetermined nominal setting.

21. The article of claim 17, wherein the instructions further enable the system to:
determine that the video window is later than the capture raster; and
adjust the pixel clock to quickly retard the display raster.

22. The article of claim 21, wherein the instructions further enable the system to:
adjust a color burst generator to maintain a viewable image on the display raster.

23. The article of claim 17, wherein the instructions further enable the system to:
determine that the video window is before the capture raster;
adjust the pixel clock to quickly advance the display raster; and
adjust a color burst generator to maintain a viewable image on the display raster.

24. The article of claim 17, wherein the instructions further enable the system to:
determine that the pixel clock is quickly advancing the display raster; and
set the pixel clock to advance the display raster.

25. The article of claim 17, wherein the instructions further enable the system to:
determine that the pixel clock is quickly retarding the display raster; and
set the pixel clock to retard the display raster.

26. A system comprising:
a pixel clock to receive a reference clock; and
a storage to store instructions that, if executed, enable the system to determine a timing relationship between a video window and a capture raster, wherein if the video window is within a display raster the pixel clock is adjusted so that the video window is not fully within the time of the capture raster.

27. The system of claim 26, wherein the storage further comprises instructions to enable the system to:
monitor the timing relationship between the display raster and the capture raster, wherein the monitoring is performed at a second frequency.

28. The system of claim 26, wherein the storage further comprises instructions to enable a the system to:
monitor the timing relationship between the display raster and the capture raster, wherein the first frequency is greater than the second frequency.

* * * * *

UNITED STATES PATENT AND TRADEMARK OFFICE
CERTIFICATE OF CORRECTION

PATENT NO. : 7,277,133 B2 Page 1 of 1
APPLICATION NO. : 11/174929
DATED : October 2, 2007
INVENTOR(S) : Benjamin M. Cahill, III It is certified that error appears in the above-identified patent and that said Letters Patent is hereby corrected as shown below:

Column 18:
Line 51, after "enable", delete "a".

Signed and Sealed this

Twenty-second Day of January, 2008

JON W. DUDAS
*Director of the United States Patent and Trademark Office*